United States Patent
Kiersten et al.

(10) Patent No.: US 12,145,550 B2
(45) Date of Patent: Nov. 19, 2024

(54) BRAKING FORCE GENERATOR FOR AN ACTUATION DEVICE OF A BRAKE SYSTEM, ACTUATION DEVICE FOR A BRAKE SYSTEM

(71) Applicant: Robert Bosch GmbH, Stuttgart (DE)

(72) Inventors: Axel Kiersten, Oberstenfeld (DE); Eduard Maiterth, Heilbronn (DE); Martin Winkler, Sonthofen (DE); Stephan Roeger, Hoepfigheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/549,410

(22) PCT Filed: Apr. 29, 2022

(86) PCT No.: PCT/EP2022/061530
§ 371 (c)(1),
(2) Date: Sep. 7, 2023

(87) PCT Pub. No.: WO2022/233735
PCT Pub. Date: Nov. 10, 2022

(65) Prior Publication Data
US 2024/0149855 A1    May 9, 2024

(30) Foreign Application Priority Data

May 5, 2021   (DE) ..................... 10 2021 204 555.3

(51) Int. Cl.
*B60T 13/74* (2006.01)
*B60T 8/171* (2006.01)
(Continued)

(52) U.S. Cl.
CPC ............ *B60T 13/745* (2013.01); *B60T 8/171* (2013.01); *B60T 13/662* (2013.01); *F15B 7/08* (2013.01);
(Continued)

(58) Field of Classification Search
CPC .... B60T 7/042; B60T 13/662; B60T 2220/04; B60T 8/171; B60T 13/745
See application file for complete search history.

(56) References Cited

FOREIGN PATENT DOCUMENTS

CN    110562228 A  * 12/2019  ............ B60T 13/143
DE   102006020041 A1 *  3/2007  ............ B60G 7/003
(Continued)

OTHER PUBLICATIONS

International Search Report for PCT/EP2022/061530, Issued Sep. 9, 2022.

*Primary Examiner* — Abiy Teka
(74) *Attorney, Agent, or Firm* — NORTON ROSE FULBRIGHT US LLP; Gerard A. Messina

(57) ABSTRACT

A braking force generator for an actuation device of a brake system. The braking force generator includes a movably supported actuator element, an electric motor which is designed to move the actuator element, a controller for controlling the electric motor, a movably supported input rod which is coupled or can be coupled to a brake pedal, a displacement sensor which is assigned to the input rod and has a transmitter and a receiver, and a communication path which is electrically connected to the receiver at one end and to the controller at the other end. The displacement sensor is arranged so as to be covered by the controller and/or adjoin the controller in plan view of the braking force generator, the viewing direction in said plan view corresponding to the movement direction of the actuator element.

15 Claims, 5 Drawing Sheets

(51) Int. Cl.
  *B60T 13/66* (2006.01)
  *F15B 7/08* (2006.01)
  B60T 13/62 (2006.01)
  H01B 7/04 (2006.01)
  H01B 7/08 (2006.01)

(52) U.S. Cl.
  CPC ........... *B60T 13/62* (2013.01); *B60T 2220/04* (2013.01); *H01B 7/04* (2013.01); *H01B 7/08* (2013.01)

(56) References Cited

FOREIGN PATENT DOCUMENTS

| | | |
|---|---|---|
| DE | 102013016912 A1 | 4/2015 |
| DE | 102014220358 A1 | 4/2016 |
| DE | 102019203511 A1 * | 9/2020 |

* cited by examiner

BRAKING FORCE GENERATOR FOR AN ACTUATION DEVICE OF A BRAKE SYSTEM, ACTUATION DEVICE FOR A BRAKE SYSTEM

FIELD

The present invention relates to a braking force generator for an actuation device of a brake system, comprising a movably supported actuator element, an electric motor which is designed to move the actuator element, a controller for controlling the electric motor, a movably supported input rod which is coupled or can be coupled to a brake pedal, a displacement sensor which is assigned to the input rod and has a transmitter and a receiver, and a communication path which is electrically connected to the receiver at one end and to the controller at the other end.

The present invention also relates to an actuation device for a brake system.

BACKGROUND INFORMATION

A hydraulic brake system of a motor vehicle generally has a plurality of friction brake devices. To actuate the friction brake devices, an actuation device with a master brake cylinder is usually provided, in which master brake cylinder at least one hydraulic piston is movably supported. The master brake cylinder is fluidically connected to slave cylinders of the friction brake devices such that the friction brake devices can be actuated by a move of the hydraulic piston.

Actuation devices with an electromechanical braking force generator are being installed more and more frequently in motor vehicle construction. A braking force generator of this type has an electric motor and a movably supported actuator element, wherein the electric motor is designed to move the actuator element. A controller is provided to control the electric motor. An electromechanical braking force generator also has a movably supported input rod which is coupled or can be coupled to a brake pedal. Typically, the controller is designed to control the electric motor depending on a sliding position of the input rod. For this purpose, a displacement sensor is provided, which is assigned to the input rod and has a transmitter and a receiver, wherein the receiver is connected to the controller by means of communication technology. In conventional electromechanical braking force generators, the communication connection is often provided by electrically connecting the receiver to a plug device arranged on a main housing of the braking force generator by means of a communication cable. The plug device is in turn electrically connected to the controller by a wiring harness of a vehicle having the braking force generator. On the one hand, such a communication connection is technically complicated and, on the other, installation space is blocked by the plug device.

German Patent Application No. DE 10 2019 203 511 A1 describes an electromechanical braking force generator comprising an internal communications link. Thus, the braking force generator itself has a communication path which is electrically connected to the receiver at one end and to the controller as the other end.

SUMMARY

The actuation device according to the present invention may have the advantage that the communication linkage of the receiver to the controller is technically simplified compared to conventional solutions. According to an example embodiment of the present invention, it is provided for this purpose that the displacement sensor is arranged so as to be covered by the controller and/or adjoin the controller in a plan view of the braking force generator, the viewing direction in said plan view corresponding to the movement direction of the actuator element. If the controller covers the displacement sensor in plan view, the displacement sensor is arranged behind the controller in the movement direction. If the displacement sensor adjoins the controller in plan view, the displacement sensor is located as a whole adjacent to the controller in plan view, preferably immediately adjacent to the controller. This does not mean that the displacement sensor is at the same height as the controller in the movement direction, because the feature "adjoins the controller" refers only to the plan view. Preferably, the controller and the displacement sensor are spaced apart in the movement direction. If the displacement sensor is covered by the controller and adjoins the controller in plan view, a first section of the displacement sensor is covered by the controller in plan view and a second section of the displacement sensor adjoins the controller. In the publication DE 10 2019 203 511 A1, various elements such as the master brake cylinder and the actuator element are arranged between the displacement sensor and the controller in plan view. With such an arrangement of the displacement sensor, the displacement sensor is spaced from the controller in plan view. The communication linkage of the displacement sensor to the controller is complicated by the fact that the communication path must be routed around the actuator element, for example. According to the present invention, the displacement sensor is assigned to the input rod. In this respect, the transmitter or the receiver is fastened to the input rod or to an element which is mechanically coupled to the input rod such that the element is moved along with the input rod when the input rod is moved. Preferably, the transmitter is fastened to the input rod or the element coupled to the input rod. Preferably, the input rod and the actuator element are movable relative to one another. According to the present invention, the braking force generator has the communication path. Preferably, the communication path extends at least substantially through one or more housings of the braking force generator. The actuator element of the braking force generator is, for example, a spindle of a spindle gear of the braking force generator.

According to an example embodiment of the present invention, preferably, the receiver is fastened to the actuator element. For example, the receiver is fastened directly, i.e., immediately, to the actuator element. Alternatively, the receiver is fastened to an element which is mechanically coupled to the actuator element such that the element is moved along with the actuator element when the actuator element is moved. With such a fastening, the receiver is indirectly, i.e. non-immediately, fastened to the actuator element. The transmitter is then fastened to the input rod or the element coupled to the input rod. In this respect, the displacement sensor is designed as a differential displacement sensor. Alternatively, the displacement sensor is preferably designed as an absolute displacement sensor. Accordingly, the displacement sensor is then designed to determine a displacement difference between an actual sliding position of the input rod and a base position that the input rod assumes in the non-actuated state.

According to a preferred embodiment of the present invention, it is provided that the communication path has a communication cable. The communication cable may compensate for movements of the receiver relative to the controller due to the flexible design of the communication cable. Particularly preferably, the communication cable is designed as a flexible flat ribbon cable. A flat ribbon cable is a cable of which the width is greater, in particular substantially greater, than its height, wherein both the width and the height—at least in the straight, unbent state of the flat ribbon cable—are aligned perpendicularly to a course of wires of the flat ribbon cable or a course of the flat ribbon cable itself. The design as a flexible flat ribbon cable is advantageous in that certain deformations occur preferentially in a flat ribbon cable, namely deformations about axes which are aligned in the width direction of the flat ribbon cable. In contrast, a flat ribbon cable is relatively rigid compared to deformations about axes aligned in the height direction of the flat ribbon cable. With a flat ribbon cable, it is therefore relatively easy to predict how the flat ribbon cable will deform when the receiver moves. Accordingly, the flat ribbon cable coming into contact with moving elements of the actuation device, for example a gear device of the actuation device, can be avoided.

According to an example embodiment of the present invention, preferably, the communication cable has a U shape, wherein legs of the U shape are aligned in parallel with the movement direction. As a result, the communication cable is arranged/can be arranged in a space-saving manner. The U shape causes a length of one of the legs to decrease when the receiver is moved, while a length of another of the legs increases.

According to an example embodiment of the present invention, preferably, the communication cable is designed such that the bulge of the U shape faces away from the controller. This ensures an advantageous feed of the two ends of the communication cable to the receiver or the controller. Particularly preferably, the communication cable is deflected only once over its entire length, namely in the region of the bulge of the U shape. Preferably, the communication cable is directly connected to the receiver.

According to an example embodiment of the present invention, preferably, the communication path has at least one contact spring, wherein the contact spring is directly electrically connected to the controller. The electrical linkage of the communication path to the controller by means of the contact spring is particularly advantageous because the contact spring can compensate for at least slight movements in the movement direction.

According to a preferred embodiment of the present invention, it is provided that the communication path has a stamped contact part, wherein the communication cable is electrically connected to the contact spring via the stamped contact part. Thus, the communication cable is electrically connected to the controller by means of the stamped contact part and by means of the contact spring. The provision of a stamped contact part is particularly advantageous because stamped contact parts, on the one hand, are mechanically robust and, on the other hand, can be manufactured inexpensively. Preferably, the stamped contact part has an elongate base body, wherein a contact plate is arranged at one end of the base body, which contact plate is aligned perpendicularly to the movement direction and on which the contact spring is supported. In this respect, the stamped contact part is designed in an L shape.

According to an example embodiment of the preset invention, preferably, the communication cable is electrically connected to the stamped contact part by means of resistance welding. This is technically simple and cost-effective.

According to a preferred embodiment of the present invention, it is provided that the braking force generator has a main housing, in particular a multi-part main housing, wherein the displacement sensor is arranged in the main housing, and wherein the main housing has a first housing wall with a bearing surface on which the controller rests. Since the controller rests on a housing wall of the main housing, the communication path can be routed from the receiver to the controller, without a section of the communication path extending outside of a housing.

According to a preferred embodiment of the present invention, it is provided that the first housing wall has an aperture which is aligned with an aperture of a housing wall of a controller housing of the controller, and that the contact spring engages through the apertures. This provides an advantageous linkage of the communication path to the controller. Preferably, the spring is guided through the aperture of the first housing wall or through the aperture of the housing wall of the controller housing.

According to an example embodiment of the present invention, preferably, the braking force generator has a sealing element which is arranged between the controller housing and the first housing wall and encloses the contact spring. This prevents moisture from entering the interior of the main housing or the interior of the controller housing. Preferably, the sealing element is an O-ring or a wet seal.

According to a preferred embodiment of the present invention, it is provided that a projection is arranged on an inner surface of the first housing wall facing away from the controller, and that the projection carries the stamped contact part. This prevents the weight of the stamped contact part and the weight of the communication cable from being applied to the contact spring. Preferably, the projection is designed as a plastic projection. Preferably, the stamped contact part is fastened to the projection by a rigid connection. Alternatively, the stamped contact part is fastened to the projection by a connection that allows at least slight movement of the stamped contact part relative to the projection. Preferably, the stamped contact part has at least one barb and is fastened to the projection by being pressed into the projection. Alternatively, the stamped contact part is fastened to the projection by the stamped contact part being sandwiched between two parts of the projection. Preferably, the projection is fastened to the first housing wall. Alternatively, the projection is designed in one piece with the first housing wall.

According to an example embodiment of the present invention, preferably, the projection is connected to the first housing wall by a latching connection. For example, the latching connection is provided by a clip.

According to a preferred embodiment of the present invention, the braking force generator has a support element, which is supported on the projection on the one hand and on a second housing wall opposite the first housing wall on the other hand. Thus, a force acting away from the first housing wall on the projection is supported by the support element. This provides a stable fastening of the projection to the first housing wall.

The actuation device for a brake system according to the present invention has a master brake cylinder and includes the braking force generator according to the present invention, wherein the master brake cylinder can be actuated by the braking force generator. This also results in the advantages already mentioned. Further preferred features and combinations of features of the present invention are found in the disclosure herein.

The present invention is explained in more detail below with reference to the figures.

DETAILED DESCRIPTION OF EXAMPLE EMBODIMENTS

Figure 1:
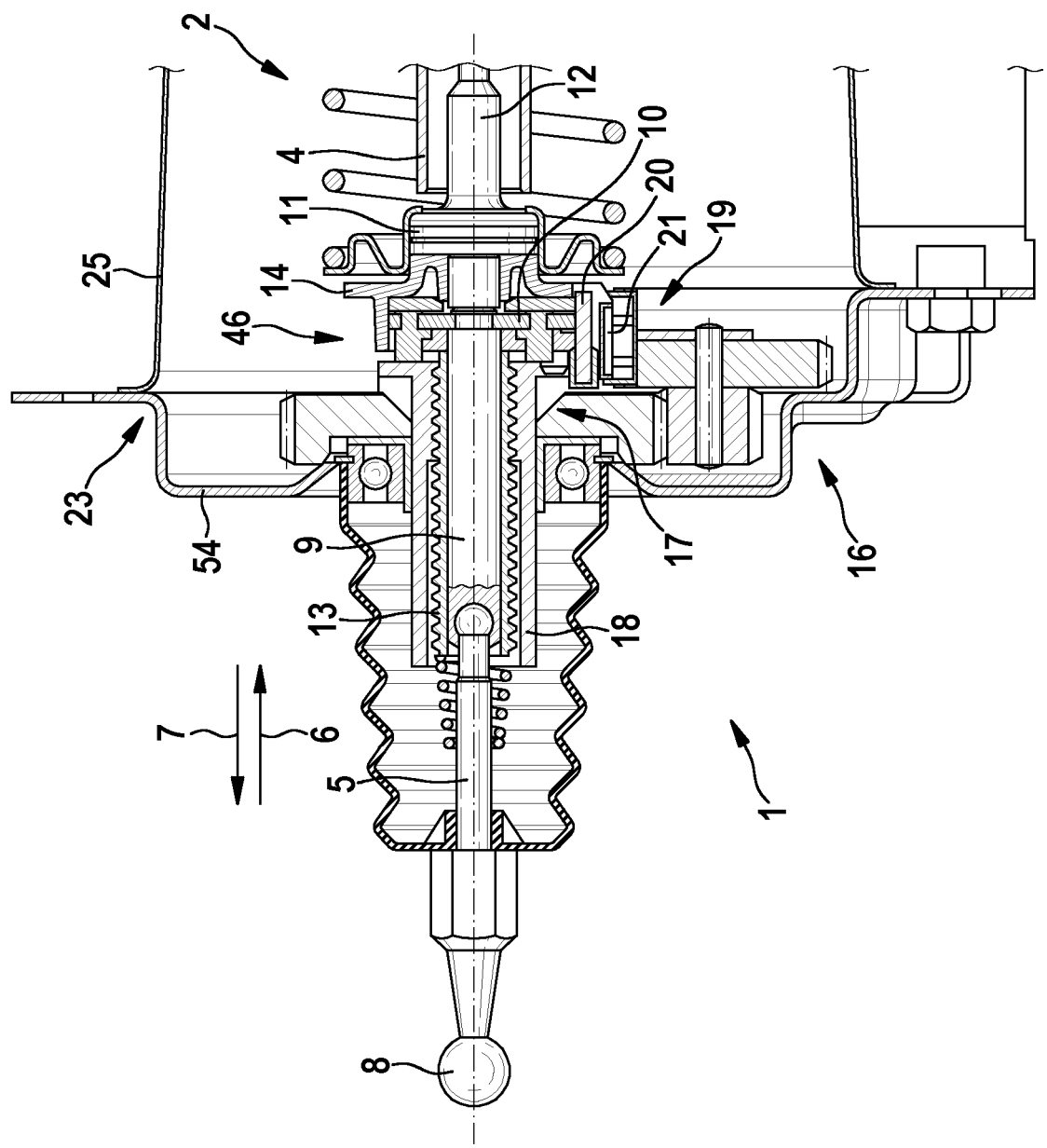
FIG. 1 is a sectional representation of a braking force generator of a brake system, according to an example embodiment of the present invention.

FIG. 1 shows a longitudinal section through a braking force generator 1 of an actuation device 2 of a brake system. The actuation device 2 has the braking force generator 1 along with a master brake cylinder 3 (not shown) in FIG. 1, in which master brake cylinder at least one hydraulic piston 4 is movably supported.

The braking force generator 1 has a movably supported input rod 5. The input rod 5 is movable in a first direction 6 and in a second direction 7 opposite the first direction 6. The directions 6 and 7 are thus movement directions of the input rod 5. In the following, the first direction 6 is also referred to as the actuation direction 6. The input rod 5 has a first end 8 which can be coupled to a brake pedal. If the first end 8 is coupled to a brake pedal, the input rod 5 is movable by the brake pedal. The input rod 5 is mechanically coupled to an input piston 9 such that the input piston 9 is moved along with the input rod 5 when the input rod 5 is moved. The input piston 9 is mechanically coupled to an input element 10 such that the input element 10 is moved along with the input piston 9 when the input piston 9 is moved. The input element 10 is thus mechanically coupled to the input rod 5 by means of the input piston 9.

If the input rod 5 is moved in the actuating direction 6, a force acting in the actuation direction 6 is transmitted to a thrust washer 11 by means of the input piston 9, and the thrust washer 11 is moved in the actuation direction 6. The thrust washer 11 is mechanically coupled to the hydraulic piston 4 by means of a thrust rod 12 such that the hydraulic piston 4 can be moved in the actuation direction 6 by moving the thrust washer 11. If the hydraulic piston 4 is moved in the actuation direction 6, a hydraulic fluid is shifted from the master brake cylinder 3 into wheel brake cylinders of friction brake devices of the brake system. As a result, a deceleration torque is generated by the friction braking devices. The master brake cylinder 3 can thus be actuated by moving the input rod 5.

The braking force generator 1 also has an actuator element 13. The actuator element 13 can also be moved in directions 6 and 7. Thus, the directions 6 and 7 are also movement directions of the actuator element 13. The actuator element 13 is mechanically coupled to an actuator washer 14 such that the actuator washer 14 is moved along with the actuator element 13 when the actuator element 13 is moved. If the actuator element 13 is moved in the actuation direction 6, a force acting in the actuation direction 6 is transmitted to the thrust washer 11 by means of the actuator washer 14, and the thrust washer 11 is moved in the actuation direction 6. Thus, the master brake cylinder 3 can be actuated by moving the actuator element 13.

The braking force generator 1 also has an electric motor 15 (not shown in FIG. 1). The electric motor 15 is designed to move the actuator element 13. For this purpose, the electric motor 15 in the present case is operatively connected to the actuator element 13 by a gear device 16. The gear device 16 has a spindle gear 17. The spindle gear 17 has a spindle nut 18 which is supported so as to be rotatable about an axis of rotation extending in the actuation direction 6. The spindle gear 17 also has a spindle. The spindle is formed by the actuator element 13. An external thread of the actuator element 13 meshes with an internal thread of the spindle nut 18 such that the actuator element 13, i.e. the spindle, can be moved by a rotation of the spindle nut 18.

The braking force generator 1 also has a displacement sensor 19. This comprises a transmitter 20, which in the present case has at least one magnet, and a receiver 21, which in the present case has at least one magnetic field-sensitive element. In the present case, the transmitter 20 is fastened to the input element 10. In this respect, the transmitter 20 is indirectly fastened to the input rod 5 and is correspondingly mechanically coupled to the input rod 5 such that the transmitter 20 is moved along with the input rod 5 by a movement of the input rod 5. Due to the arrangement of the transmitter 20 on the input element 10, the displacement sensor 19 is assigned to the input rod 5. In the present case, the receiver 21 is fastened to the actuator washer 14. In this respect, the receiver 21 is indirectly fastened to the actuator element 13 and is correspondingly mechanically coupled to the actuator element 13 such that the receiver 21 is moved along with the actuator element 13 by a movement of the actuator element 13. Due to the arrangement of the transmitter 20 and the receiver 21, the displacement sensor 19 is designed as a differential displacement sensor.

The braking force generator 2 also has a multi-part main housing 23. The main housing 23 has a first housing part 54 and a second housing part 25 fastened to the first housing part 54. The gear device 16, the thrust washer 11, the thrust rod 12, the actuator element 13 and the displacement sensor 19, for example, are arranged in the main housing 23.

The braking force generator 2 also has a controller 22 for controlling the electric motor 15. The controller 22 is also not shown in FIG. 1. The controller 22 is designed to control the electric motor 15 depending on the sensor signal from the displacement sensor 19 or a sliding position of the input rod 5.

In this case, the controller 22 is spaced from the displacement sensor 19 with respect to directions 6 and 7.

The braking force generator 1 has a communication path 24 for the communication connection of the controller 22 to the displacement sensor 19. For reasons of clarity, the communication path 24 is not shown in FIG. 1. The design of the communication path 24 is explained in more detail below with reference to FIGS. 2 through 4.

Figure 2:
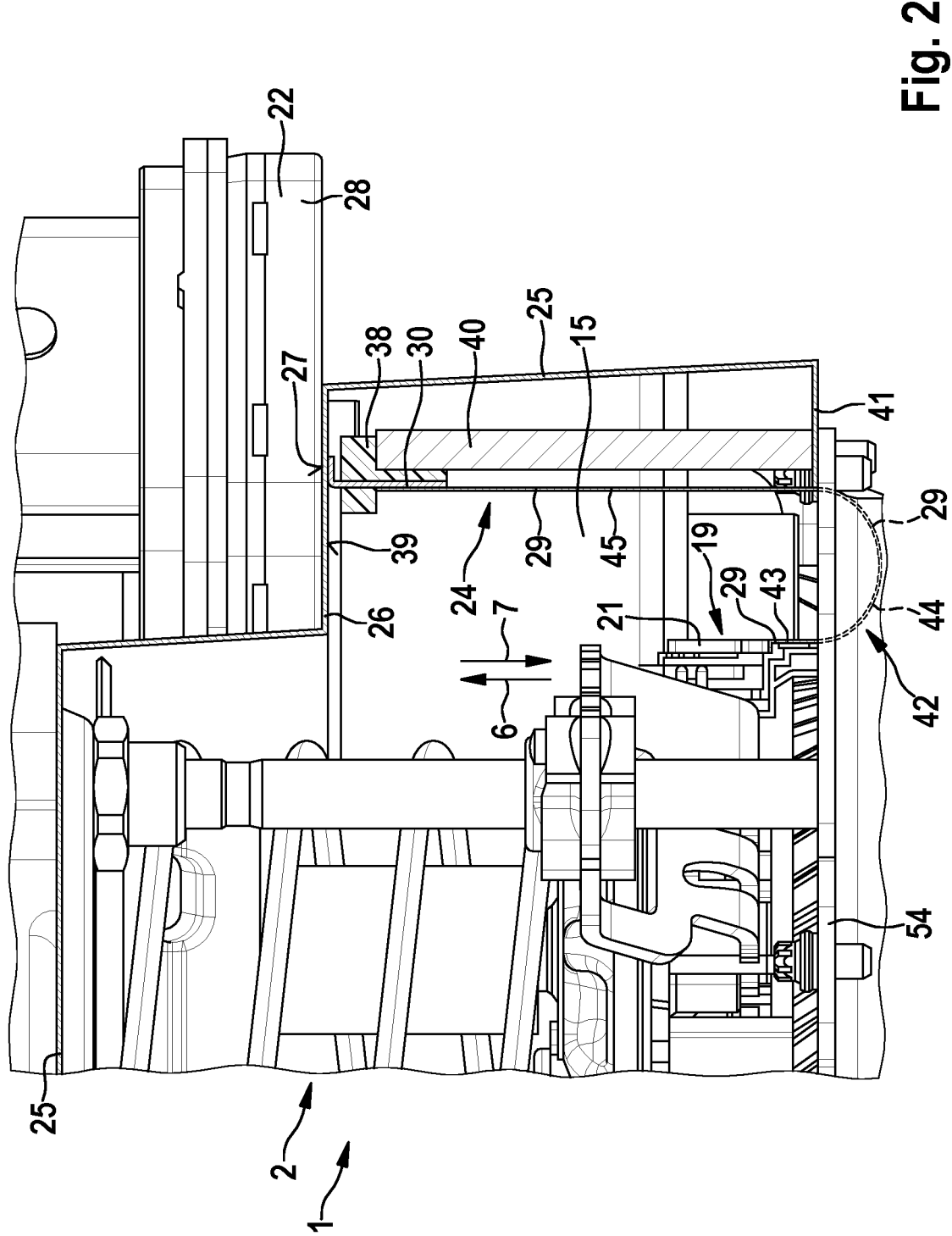
FIG. 2 is a perspective representation of the braking force generator, according to an example embodiment of the present invention.

As can be seen from FIG. 2, the second housing part 25 of the main housing 23 has a first housing wall 26. The first housing wall 26 has a bearing surface 27 on which the controller 22 or a controller housing 28 of the controller 22 rests from the outside. Thus, the controller 22 is located outside the main housing 23.

The communication path 24 has a communication cable 29, which in the present case is a flexible flat ribbon cable 29. The communication cable 29 is electrically connected directly to the receiver 21 at one end. The communication cable 29 is electrically connected at the other end to a stamped contact part 30 of the communication path 24. In the present case, the communication cable 29 is electrically connected to the stamped contact part 30 by means of resistance welding. A stamped contact part is a contact part produced by stamping.

Figure 3:
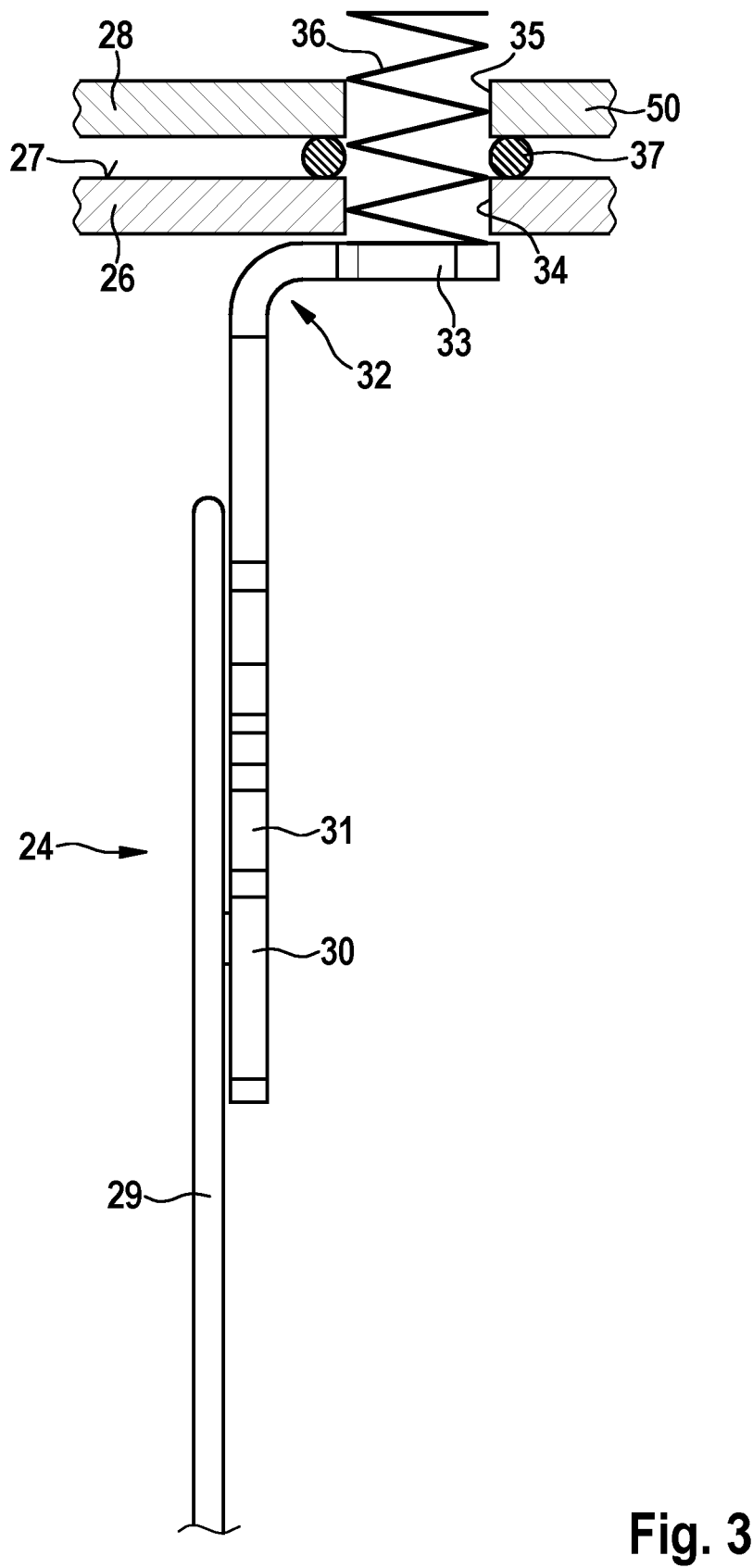
FIG. 3 shows a communication path of the braking force generator, according to an example embodiment of the present invention.

As can be seen in FIG. 3, the stamped contact part 30 has an elongate base body 31. A first end 32 of the base body 31 has a contact plate 33. Thus, the stamped contact part 30 is designed in an L shape as a whole. The contact plate 33 is aligned perpendicularly to directions 6 and 7.

The first housing wall 26 has an aperture 34, which is aligned with an aperture 35 of a housing wall 50 of the controller housing 28. The stamped contact part 30 is electrically connected to the controller 22 by a plurality of contact springs 36 of the communication path 24, wherein only a single one of the contact springs 36 is evident in FIG. 3. The contact springs 36 engage through the apertures 34 and 35 of the first housing wall 26 and the housing wall 50 of the controller housing 28, respectively. A sealing element 37 is arranged between the controller housing 28 and the first housing wall 26 to enclose the contact springs 36.

The communication path 24 is thus formed in the present case by the communication cable 29, the stamped contact part 30 and the contact springs 36.

As can be seen from FIG. 2, the braking force generator 1 further has a plastic projection 38, which is arranged on an inner surface 39 of the first housing wall 26 facing away from the controller 22. The plastic projection 38 supports the stamped contact part 30. Thus, the stamped contact part 30 is fastened to the plastic projection 38, for example, by means of a rigid connection or a connection that allows at least slight movement of the stamped contact part 30 relative to the plastic projection 38.

Figure 4:
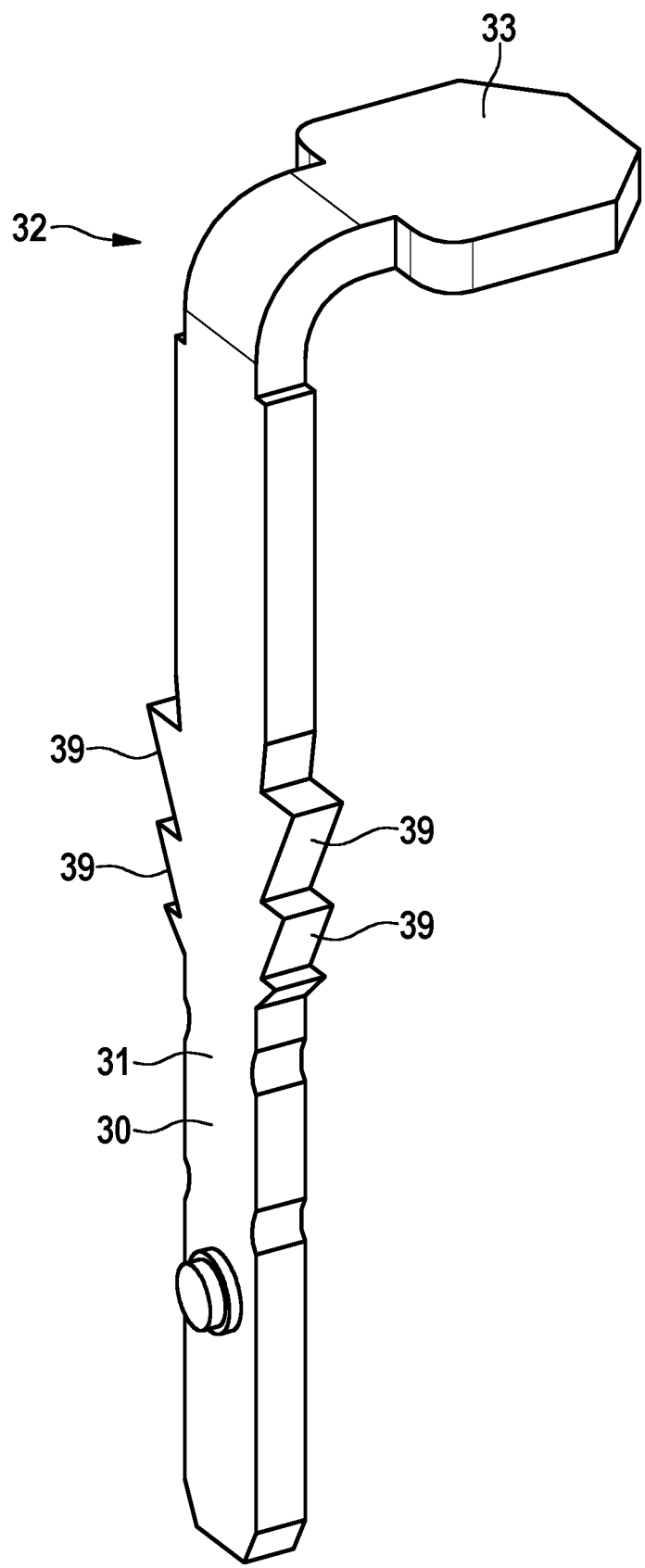
FIG. 4 shows a stamped contact part of the communication path of the braking force generator, according to an example embodiment of the present invention.

As can be seen in FIG. 4, the stamped contact part 30 in the present case has several barbs 39. Preferably, the stamped contact part 30 is pressed into the plastic projection 38 such that the stamped contact part 30 is fastened to the plastic projection 38 by means of the barbs 39 by positive locking.

In the present case, the plastic projection 38 is fastened to the first housing wall 26 by a latching connection. In addition, a support element 40 is provided, which is supported on the plastic projection 38 on the one hand and on a second housing wall 41 opposite the first housing wall 26 on the other hand. In this respect, the plastic projection 38 is subjected to a force acting in the actuation direction 6 by the support element 40 and is forced against the first housing wall 26.

As can be seen from FIG. 2, the communication cable 29 is arranged or designed such that the communication cable 29 has a U shape 42. In this respect, the communication cable 29 has a first leg 43 which extends from the receiver 21 in a direction opposite the actuation direction 6, i.e. in the direction 7. Adjacent to the first leg 43 is a bulge 44 of the U shape facing away from the controller 22, i.e. in the direction 7. A second leg 45 adjoins the bulge 44 and extends from the bulge 44 in the direction of the controller 22, i.e. in the actuation direction 6.

Figure 5:
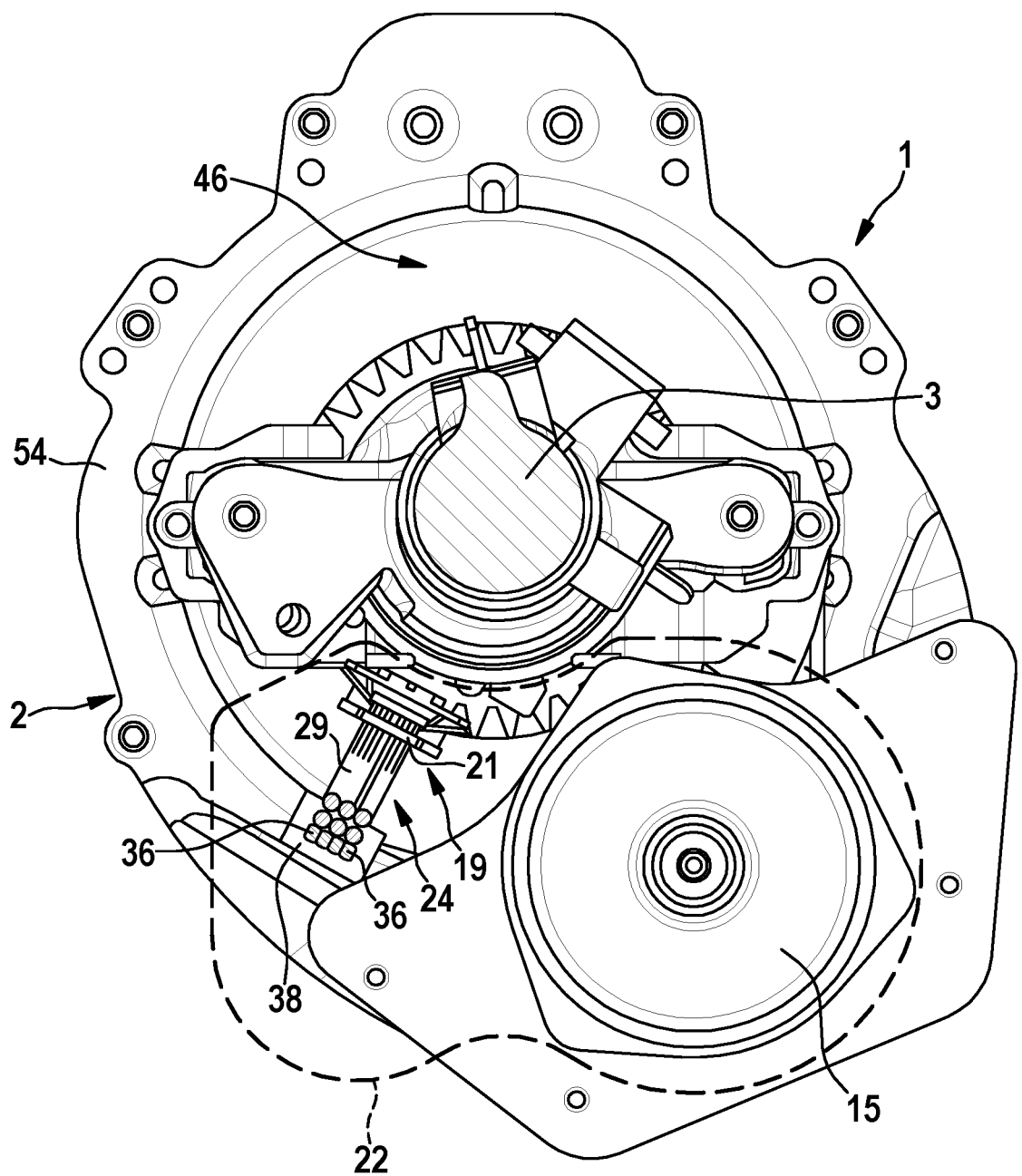
FIG. 5 is a plan view of the braking force generator, according to an example embodiment of the present invention.

With reference to FIG. 5, the arrangement of the displacement sensor 19 relative to the controller 22 is explained in more detail below. For this purpose, FIG. 5 shows a plan view of the braking force generator 1. In this case, the viewing direction corresponds to a movement direction of the actuator element 13, namely the direction 7. As can be seen in FIG. 5, the displacement sensor 19 is arranged such that the controller 22 shown in dashed lines in FIG. 5 covers the displacement sensor 19. Due to this arrangement of the displacement sensor 19, the communication linkage of the receiver 21 to the controller 22 by means of the communication path 24 is technically simple. In the present case, the elements of the communication path 24, i.e. the communication cable 29, the stamped contact part 30 and the contact springs 26, are also arranged such that the controller 22 covers such elements.

In conventional braking force generators, the displacement sensor 19 is usually arranged in a region 46 with reference to the plan view shown in FIG. 5. With such an arrangement of the displacement sensor 19, the actuator element 13 along with other elements of the braking force generator 1 are located between the displacement sensor 19 and the controller 22 with respect to the plan view. The displacement sensor 19 is then arranged such that it is spaced from the controller 22 with respect to the plan view. With such an arrangement of the displacement sensor 19, the communication linkage between the receiver 21 and the controller 22 is made more difficult.

The invention claimed is:

1. A braking force generator for an actuation device of a brake system, comprising:
   a movably supported actuator element;
   an electric motor configured to move the actuator element;
   a controller configured to control the electric motor;
   a movably supported input rod which is coupled or can be coupled to a brake pedal;
   a displacement sensor assigned to the input rod and having a transmitter and a receiver; and
   a communication path which is electrically connected to the receiver at one end and to the controller at another end;
   wherein the displacement sensor is arranged so as to be covered by the controller and/or adjoin the controller in a plan view of the braking force generator, a viewing direction in the plan view corresponding to a movement direction of the actuator element.

2. The braking force generator according to claim 1, wherein the receiver is fastened to the actuator element.

3. The braking force generator according to claim 1, wherein the communication path has a communication cable including a flat flexible ribbon cable.

4. The braking force generator according to claim 1, wherein the communication cable has a U shape, wherein legs of the U shape are aligned in parallel with the movement direction.

5. The braking force generator according to claim 4, wherein the communication cable is configured such that a bulge of the U shape faces away from the controller.

6. The braking force generator according to claim 1, wherein the communication path has at least one contact spring, wherein the contact spring is directly electrically connected to the controller.

7. The braking force generator according to claim 6, wherein the communication path has a stamped contact part, wherein the communication cable is electrically connected to the contact spring via the stamped contact part.

8. The braking force generator according to claim 7, wherein the communication cable is electrically connected to the stamped contact part by resistance welding.

9. The braking force generator according to claim 1, wherein the braking force generator has a multi-part main housing, wherein the displacement sensor is arranged in the main housing, and wherein the main housing has a first housing wall with a bearing surface on which the controller rests.

10. The braking force generator according to claim 9, wherein the first housing wall has an aperture which is aligned with an aperture of a housing wall of a controller housing of the controller, and the contact spring engages the controller through the apertures.

11. The braking force generator according to claim 10, further comprising a sealing element which is arranged between the controller housing and the first housing wall and encloses the contact spring.

12. The braking force generator according to claim 9, wherein the communication path has a stamped contact part, wherein the communication cable is electrically connected to the contact spring via the stamped contact part, and wherein a plastic projection is arranged on an inner surface of the first housing wall facing away from the controller, and the projection carries the stamped contact part.

13. The braking force generator according to claim 12, wherein the projection is connected to the first housing wall by a latching connection.

14. The braking force generator according to claim 12, further comprising a support element which is supported on the projection and on a second housing wall opposite the first housing wall.

15. An actuation device for a brake system, comprising:
a master brake cylinder; and
a braking force generator, the master brake cylinder being actuated by the braking force generator, wherein the braking force generator includes:
 a movably supported actuator element,
 an electric motor configured to move the actuator element,
 a controller configured to control the electric motor,
 a movably supported input rod which is coupled or can be coupled to a brake pedal,
 a displacement sensor assigned to the input rod and having a transmitter and a receiver, and
 a communication path which is electrically connected to the receiver at one end and to the controller at another end,
wherein the displacement sensor is arranged so as to be covered by the controller and/or adjoin the controller in a plan view of the braking force generator, a viewing direction in the plan view corresponding to a movement direction of the actuator element.

* * * * *